United States Patent Office 3,470,293
Patented Sept. 30, 1969

3,470,293
PESTICIDAL PREPARATIONS
Max Geiger, Riehen, Switzerland, assignor to Ciba Limited, Basel, Switzerland, a company of Switzerland
No Drawing. Continuation of application Ser. No. 388,933, Aug. 11, 1964. This application June 12, 1967, Ser. No. 645,547
Claims priority, application Switzerland, Aug. 14, 1963, 10,024/63
Int. Cl. A01n 9/36, 17/14
U.S. Cl. 424—84       3 Claims This application is a continuation of copending application Ser. No. 388,933, filed Aug. 11, 1964, now abandoned.

The present invention provides pesticidal preparations, especially for use as scattering baits for combating insects, which comprises (a) A volatile insecticidal organic phosphorus compound,
(b) Finely dispersed silica, and
(c) A carbohydrate suitable for ingestion by the pests.

There may also be present in the preparations one or several of the following further additives:

(d) A preferably red dyestuff which attracts the organisms to be combated,
(e) A bitter substance, preferably sucrose-octaacetate, and
(f) An adhesive, preferably white petroleum jelly.

The invention provides above all a scattering bait for combating harmful insects, for example flies, containing as component (a) dimethyl dichlorovinyl phosphate or a derivative, especially a homologue, thereof; as component (b) finely dispersed silica gel having an inner surface greater than 50 m.²/gram, preferably 150 to 600 m.²/gram, and as component (c) saccharose.

An advantage of the new preparations is that the vapour pressure of the volatile organic phosphorus compounds present is substantially lowered. Accordingly, they remain active for a long time.

The term "volatile insecticidal organic phosphorus compound" includes all compounds of the type mentioned which, as individual substances, develop a vapour pressure that suffices to release an amount, possibly a minimum amount, of the substance concerned into the surroundings.

As examples of the above-mentioned volatile compounds there may be mentioned those containing the grouping $$\underset{R'-O}{\overset{R-O}{\diagdown}}\overset{O}{\underset{\|}{P}}-Z-\overset{R''}{\underset{|}{C}}=C\overset{Hal}{\diagdown}_{Hal} \quad \text{or} \quad \underset{R'-O}{\overset{R-O}{\diagdown}}\overset{O}{\underset{\|}{P}}-O-CH=CHCl$$

wherein R and R' each represents an alkyl radical containing 1 to 5 carbon atoms, R" represents hydrogen or a methyl radical, Z is an oxygen atom or a sulfur atom and Hal represents a halogen atom, preferably chlorine or bromine, for example especially dimethyl dichlorovinyl phosphate (DDVP) or diethyl dichlorovinyl phosphate, dipropyl- or dibutyl-dichlorovinyl phosphates, diamyl dichlorovinyl phosphates, dimethyl- or diethyl-dibromovinyl phosphate or methylethyl dichlorovinyl phosphate. As a further example there may be mentioned the compound of the formula $$\underset{\text{(phenyl)}}{\diagup}\overset{CH_3O}{\diagdown}\overset{O}{\underset{\|}{P}}-O-\overset{H}{\underset{|}{C}}=C\overset{Cl}{\diagdown}_{Cl}$$

The above-mentioned scattering bait may also be mixed with a solid vehicle, for example sand, cork meal or wood meal. The new preparations may further contain compounds having a stabilizing effect on the active substance, for example an antioxidant, such as one of the aliphatic or aromatic oxidation, inhibitors usually used, for example 1,2-propylene-glycol, 2,6-di-tertiary butyl-phenol, butyl hydroxyanisole, bis (3,5-di-tertiary butyl-4-hydroxyphenyl)-methane, 3,5-di-tertiary butyl - 4 - hydroxybenzyl alcohol, 3,5-diisopropyl-4-hydroxybenzyl alcohol, or simpler phenolic compounds, for example hydroquinone, resorcinol or pyrogallol.

When the preparations of the invention are used as stomach bait against flies, it is essential that the silica-component should be distributed in the mixture of active substance+vehicle in a particle size that enables the preparation to be readily taken in by the feeding organ of the pest to be combated, for example through the snout of flies. Thus, for example, in combating the house fly (*Musca domestica*) it has been found especially advantageous when the silica is present in the stomach bait in a particle size of 40µ or less.

The addition of an adhesive, for example white petroleum jelly, has the purpose of fixing the silica or the mixture of silica with the active substance on the carbohydate, for example saccharose.

The following examples illustrate the invention the parts being by weight:

EXAMPLE 1

(a) A mixture, to be used as scattering bait S, was prepared from the undermentioned ingredients and tested for its effect upon flies:

Preliminary mixture A

|  | Parts |
|---|---|
| Saccharose (granulated sugar) | 96 |
| White petroleum jelly (gelatinous mixture of hydrocarbons and paraffins, M.P. 35°–45° C. | 1.8 |
| Sucrose octaacetate | 0.1 |
| Red pigment dyestuff | 0.1 |

Preliminary mixture B

|  | Parts |
|---|---|
| Silica gel A (particle size below 40µ) | 1.8 |
| Dimethyl dichlorovinyl phosphate (DDVP) | 0.2 |

The homogeneous preliminary mixtures A and B were then intimately mixed together. The bait thus obtained was put into Petri dishes, flies (*Musca domestica*) were placed on them and they were then covered with wire gauze.

Evaluations were performed after intervals of 2 hours. The infestation with flies and the evaluation of the insecticidal effect were repeated at certain intervals over the test period of 19 days.

(b) For comparison, two scattering baits, $K_1$ and $K_2$ were prepared from the ingredients listed above under (a), except that silica gel A was replaced in the case of $K_1$ by kieselguhr and in the case of $K_2$ by calcined and ground perlite, as marketed under the trademark "Dicalite." The scattering baits $K_1$ and $K_2$ were tested for their insecticidal effects under the same conditions as scattering bait S. The results are likewise shown in Table I.

TABLE I

| Scattering bait | Effect on flies after (days)— | | | |
|---|---|---|---|---|
|  | 1 | 4 | 6 | 19 |
| S | + | + | + | / |
| $K_1$ | + | / | − | − |
| $K_2$ | + | − | − | − |

Legend: +=all flies killed off within 2 hours; /=over 50% of the flies killed off within 2 hours; −=all flies left alive.

Corresponding results were obtained by incorporating in the mixtures of the above composition as active substance the compound of the formula

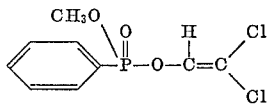

instead of dimethyl dichlorovinyl phosphate.

Similar effects are obtained with any preparation wherein component (a) is present in an amount of 0.05 to 2.0 percent by weight calculated on the total weight of the mixture, component (b) is present in an amount of 1 to 10 percent by weight, calculated on the total weight of the mixture, and component (c) is present in an amount of 80 to 98 percent by weight, calculated on the total weight of the mixture.

EXAMPLE 2

The same scattering baits as described under (a) and (b) in Example 1 were prepared, except that the active substance was the DDVP homologue diethyl dichlorovinyl phosphate instead of DDVP.

The scattering bait containing the component silica gel A (cf. Example 1a; scattering bait S) retained its full potency for 13 days, whereas the bait containing the component kieselguhr (cf. Example 1b; scattering bait $K_1$ remained fully active for one day only.

A protracted action as stomach poisons against insects was also developed by those scattering baits of the compositions shown in Example 1 and 2 which contain as the silica component, instead of silica gel A, the products marketed under the trade names "Hisil" or "Zeosil" which likewise consist substantially of finely dispersed silica.

What is claimed is:

1. A scattering stomach bait for combating harmful insects including houseflies, substantially lowering the vapour pressure of volatile organic phosphorus insecticides, consisting essentially of (a) an insecticidally effective amount of a volatile organic phosphorus insecticide selected from the group consisting of dimethyl-dichlorovinyl phosphate, dimethyl-dichlorovinyl phosphate or diethyl-dichlorovinyl phosphate, dipropyl- or dibutyl-dichlorovinyl phosphates, diamyl-dichlorovinyl phosphates, dimethyl- or diethyl-dibromovinyl phosphate, methylethyl dichlorovinyl phosphate, and the compound of the formula

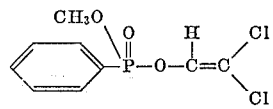

(b) 1 to 10% by weight of a finely dispersed silica gel having an inner surface greater than 50 m.²/gram and a particle size of 40 microns, or less, (c) and the remainder being sugar, sucrose octaacetate, a red dyestuff which attracts flies, and white petroleum jelly in a quantity sufficient to adhere said components.

2. The bait according to claim 1 wherein said phosphorus insecticide is present in an amount from about 0.05–2% by weight.

3. A scattering bait as claimed in claim 2, wherein component (a) consists of dimethyldichlorovinyl phosphate and component, (b) has an inner surface of 150 to 600 m.²/gram.

References Cited

FOREIGN PATENTS 918,825   2/1963   Great Britain.

LEWIS GOTTS, Primary Examiner

S. K. ROSE, Assistant Examiner

U.S. Cl. X.R.

424—219, 357, 361